April 27, 1948.   E. M. DELORAINE ET AL   2,440,250
RADIO LOCATION SYSTEM
Filed June 3, 1943    2 Sheets-Sheet 2

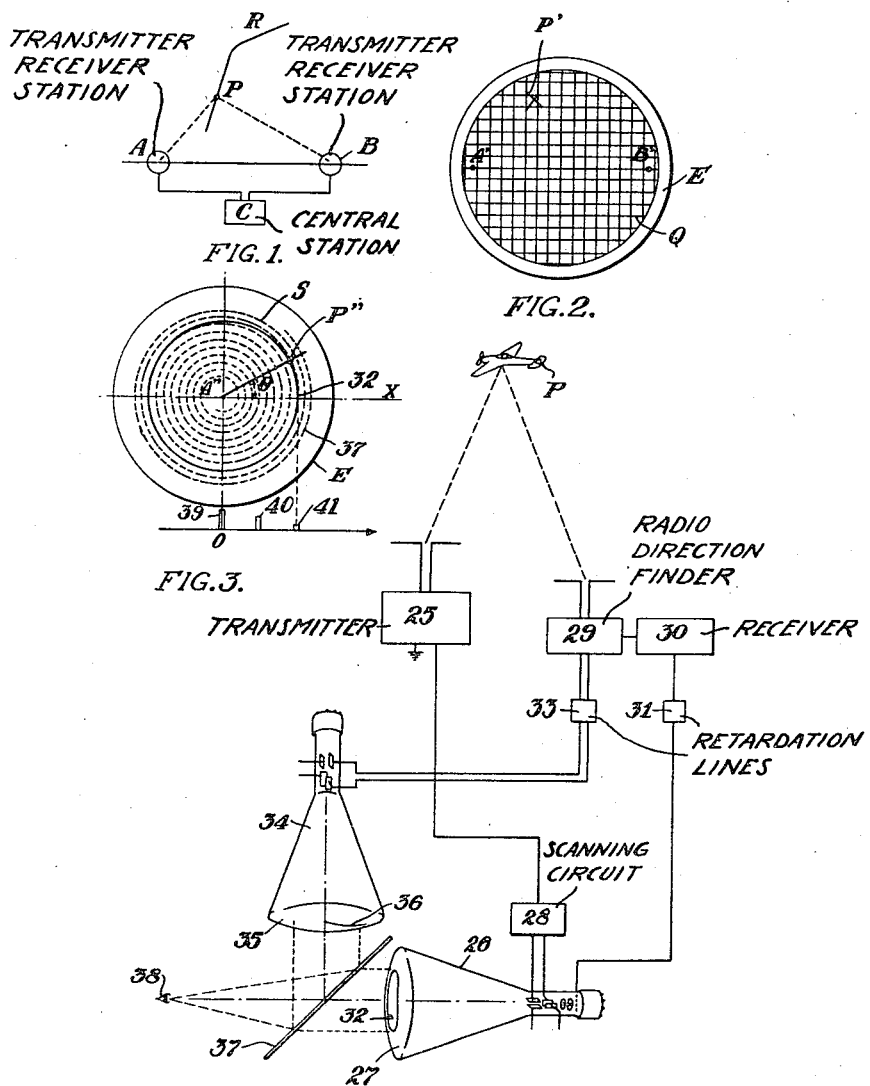

INVENTORS
EDMOND M. DELORAINE
EMILE LABIN
PAUL F. M. GLOESS
BY
AGENT

Patented Apr. 27, 1948

2,440,250

UNITED STATES PATENT OFFICE 2,440,250

RADIO LOCATION SYSTEM

Edmond M. Deloraine and Emile Labin, New York, N. Y., and Paul François Marie Gloess, Paris, France, assignors to International Standard Electric Corporation, New York, N. Y., a corporation of Delaware Application June 3, 1943, Serial No. 489,476
In France April 4, 1940

1 Claim. (Cl. 250—1.70)

The present invention refers to devices indicating successive positions of moving bodies, and also to remote control systems for these moving bodies.

More particularly, one of the objects of the invention is to provide indicating devices for following from a central station on the ground the displacements in space of a moving body, such as an airplane, provided with radioelectric communication means, either active, such as a transmitting-receiving station, for example, or passive, as, for example, a reflecting system which further may be reduced to the reflecting surfaces of the airplane.

According to certain features of the invention, two radioelectric land stations located at given points far from each other emit periodical radiations, for example trains of pulses, which are returned by the moving body, either by radioelectric communication means of the usual types on board the moving body, or by reflecting means installed on the moving body or forming part of the moving body, the return radiations being received by said land stations and applied to an indicating device at one of the stations or at a central post connected to the stations.

According to other features of the invention, the radiations periodically emitted by the land stations may be of different wavelengths, the return radiations transmitted by the moving body themselves being of different wavelengths with respect to one another and preferably with respect to the former, in the case where the moving body is provided with means for receiving and retransmitting the radiations of the land stations.

The invention also provides at each land station means for emitting a directed radiation periodically and means for finding the direction of the energy of this radiation that is reflected by the moving body, in the case where this moving body is not equipped with active radioelectric means.

According to still other features of the invention, the signals periodically transmitted and received by the land stations are applied to such an indicating device that it furnishes a precise, continuous or intermittent, indication of the geographical position of the moving body on a screen that also shows geographical locations of interest, such as the land stations, or points that the moving body must pass or fly over.

According to other features of the invention, such indicating devices may consist of an assembly of two cathode-ray oscillographs so associated with a screen that the two luminous indications respectively controlled by the signals transmitted and received by each land station will appear simultaneously on the said screen, each centered about a point which corresponds to the position of the respecive land station which receives the particular signal. The said screen may consist of an unsilvered mirror arranged at 45° between the fluorescent faces of the cathode-ray oscillographs arranged at 90° either at one of the land stations or at a central post connected to these stations. One or both particular indications on each fluorescent screen may be obtained, according to another feature of the invention, by applying to the two pairs of deflection electrodes of each oscillograph such phase- and amplitude-deflecting voltages that in the absence of impressed signals the luminous spot will describe a spiral. The application to such an oscillograph of a signal such as a pulse or still better a pair of pulses, for example to the control grid, owing to the relative duration of the received signal with respect to the angular speed at which the spiral is described will furnish a practically complete circle on the fluorescent screen. On the common translucent screen will be obtained therefore two circles, each centered about a point corresponding to one of the land stations, whose intersection will define the position of the moving body with respect to the land stations.

According to a still another feature of the invention, the position of the moving body can be watched with variable precision by causing the definition of the screen scanning diagram to vary, which results in a modification, enlargement or reduction, of the geographical area under watch.

The invention will be explained in detail in the following description, given with reference to the accompanying drawings, in which:

Fig. 1 shows schematically a system for watching and guiding moving bodies, in accordance with features of the invention;

Fig. 2 shows an indicating-device screen corresponding to the system shown in Fig. 1;

Fig. 3 shows the screen of a cathode-ray oscillograph, upon which appear the indications used in the present invention;

Figs. 4 and 5 show schematically two embodiments of a system for watching and guiding moving bodies, incorporating features of the invention.

Figure 4:
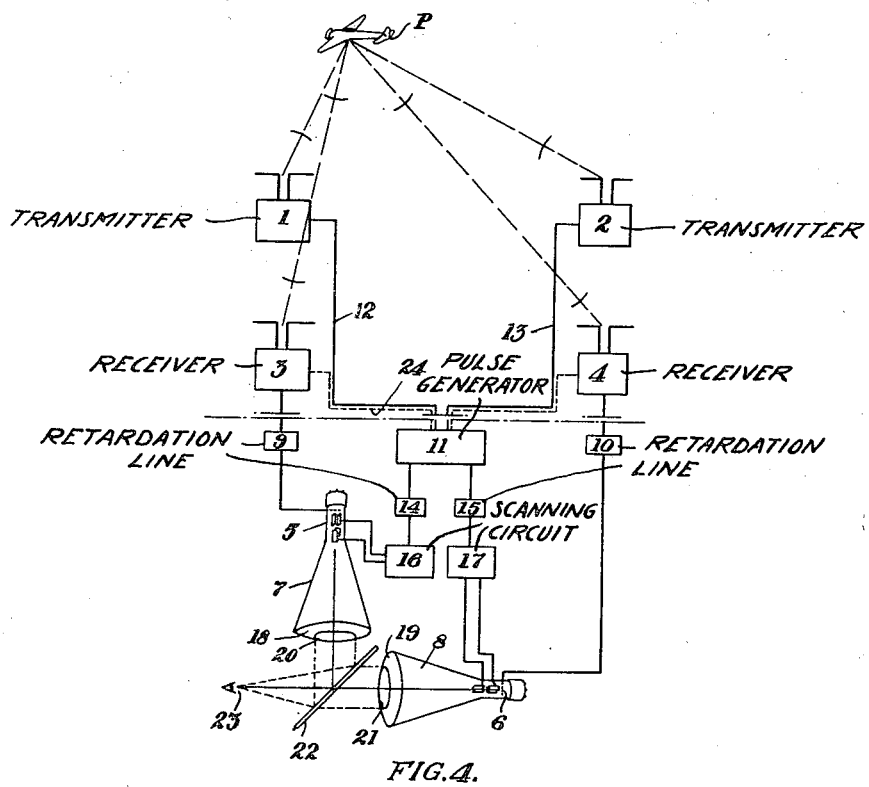

In Fig. 1 are shown at A and B two watch stations connected to an exchange C by cable or by radio. At P is indicated a moving body following a route R. Exchange C also may be located conveniently at one of the watch stations themselves, A or B.

The problem consists in reproducing upon the screen of an indicating device such as E (Fig. 2) the relative position —A', B', P' of stations A and B and of moving body P, hence in solving triangle ABP in graphic and automatic fashion. When moving body P is in active communication with stations A and B or one of the stations only, it is possible, moreover, to obtain additional indications transmitted by the moving body, it being possible likewise to convert these radio indications into visual indications if desired.

Where only one station A or B is available, it will be necessary to reproduce upon the screen of an indicating device the relative positions of that station end of moving body P, so as to obtain a double indication on that station, while when two fixed stations are available a single indication will suffice at each station. In other words, where two stations A and B cooperate with the moving body it will suffice to determine either the distance or the bearing of the moving body with respect to each station, while when only one station cooperates with the moving body it will be necessary to obtain simultaneously an indication as to the distance and an indication as to the bearing of the moving body. In Fig. 2 the actual position of point P will be determined by the locations of three points A', B', and P', by means of squared scaled Q, while in Fig. 3, which represents the case involving only one fixed station, the position of the moving body will be determined by the distance A"P" and the angle $\theta$ of the straight line A"P" with an axis of origin of angles A"X.

To obtain such a result, the invention provides particularly the use of a particular scanning of a luminous-indication oscillograph, such as a cathode-ray oscillograph. Such a spiral scanning, indicated by a dotted line at S in Fig. 3, can be obtained by applying to the two pairs of deflecting elements of the cathode-ray oscillograph sinusoidal voltages suitably shifted in phase and the amplitude of which varies slowly. This may be done, for instance, in the manner shown in the United States Patent No. 1,706,185. The law of variation of these sinuosoidal voltages is so adjusted that the radius of the spiral at each point varies proportionately to the distance that would be covered by the moving body if it were displaced in a straight line at a constant speed. The reception at the central station of a signal coming from a fixed station and corresponding to an indication about the distance or the bearing of the moving body causes the application of a grid voltage of the cathode-ray oscillograph, the normal grid voltage being such that no trace will appear upon the luminescent screen of the said oscillograph. The resultant indication is a practically complete luminous circle owing to the relative duration of the received signal with respect to the angular speed at which the spiral is described.

By providing another oscillograph similarly controlled from another fixed station, another luminous circle will be obtained also on the screen of this latter oscillograph. By superimposing the two indications, the intersection of these two circles will indicate the moving body under observation.

Such an indicating device is therefore of particularly advantageous use with a watching system in accordance with another aspect of the invention, such as shown in Fig. 1. Various arrangements relative to this watching system and incorporating features of the invention will now be described.

Stations A and B each comprise a radioelectric transmitter 1, 2 and a radioelectric receiver 3, 4, as shown in Fig. 4. Transmitter 1 of watch station A emits short periodical pulses on carrier frequency f1 and transmitter 2 of watch station B on carrier frequency f2. Preferably, but not necessarily, the transmission is effected on ultrashort wavelengths, metrical or decimetrical wavelengths, for example.

The signals coming from transmitters 1 and 2 are received by moving-body P, shown in the form of an airplane in Fig. 4. This moving body is provided with either active or passive radioelectric means for returning the signals in harmony with the emissions from A and B. It may, for example, be provided with two receivers tuned to frequencies f1 and f2 and with two transmitters automatically or otherwise retransmitting emissions f1 and f2, either on the same frequencies or on different frequencies f3 and f4. Or still, the moving body may be provided with two reflecting antennas tuned to frequencies f1 and f2 that will return the emissions by reflection. When the moving body does not cooperate voluntarily with stations A and B, a portion of the emissions from transmitters 1 and 2 will be reflected by the action of the moving body itself or, more properly speaking, of the metallic masses carried by it.

Regardless of the manner in which the emissions from transmitters 1 and 2 are returned by the moving body, the return signals are received by receivers 3 and 4 at each of stations A and B, respectively. The received signals are applied at central station C to control grids 5 and 6 of two cathode-ray oscillographs 7 and 8, after having been suitably retarded in artificial retardation lines 9 and 10.

The control of the scanning of each oscillograph is accomplished in the manner described above for obtaining a spiral scanning of the screen. For this purpose a pulse generator 11, installed at central station C, for example, simultaneously supplies the pulses sent out by transmitters 1 and 2, located at stations A and B, as indicated by cables 12 and 13, and synchronizes the spiral deflection voltages applied to the respective deflection plates of cathode-ray oscillographs 7 and 8, over suitable retardation lines 14 and 15 and scanning-voltage generating circuits 16 and 17. Because of the synchronization of the scanning voltages with the pulse generator 11, each spiral starts from the center a predetermined time determined by the retardation lines 14 and 15 after the pulse is transmitted.

These various circuit members, retardation lines, scanning-voltage generators, and pulse transmitters and receivers may be of any suitable types and hence will not be described in greater detail, being known in themselves.

Through the combination of spiral scannings and of pulses applied to the control grids of the oscillographs, and thanks to the synchronized-control method just described, two circular indications 20 and 21 are obtained on the oscillograph screens 18 and 19. The diameter of each circle 20 and 21 corresponds, respectively to the distance of the moving body P from each station A and B. By simultaneously observing these two luminous indications 20 and 21, for example by means of a translucent screen 22 that will reflect the light coming from 20 while allowing the light coming from 21 to pass through, the relative position of moving body P with respect to stations A and B will be defined by an observer 23 through the intersections of the two circles 20 and 21, whose centers correspond to the locations of A and B; that is to say, the observer will see on screen 22 an image similar to that shown in Fig. 2. The coordinates of point P' can then be read on squared scale Q.

Retardation lines 9, 10 and 14, 15, are adjusted so as to take into account the constant time delay in the equipment on moving-body P and in receivers 3 and 4 and the transit time from each station A and B to central station C, in order to refer the pulse arrival time to a common time origin.

Line 24 indicates a control line for receivers 3 and 4, which may be used for sensitivity-control circuits for the receivers.

In the embodiment just described, the coordinates of moving body P measured with respect to station A and B were the distances AP and PB. However the measured coordinates of moving body P may be the distance twice the distance AP and the length equal to the sum of distances AP plus PB.

For this purpose, only one radioelectric transmitter transmitting towards the moving body need be used. This transmitter, located at A, for example, is to transmit on a carrier frequency $f$, as before, short periodical pulses at predetermined time intervals for a period of time sufficient to make a measurement. These pulses will be received by moving-body P, whence they will be returned, either simply by means of an antenna tuned to frequency $f$, or after amplification on frequency $f$ by a relay, or after a change in frequency or detection and new modulation on another frequency $f'$. The re-radiation by the moving body may further be effected automatically by arranging a device on board the moving body so that it will be released either by the signal coming from the transmitter located at A or else at a predetermined instant by means of clockwork.

Two receivers located respectively at A and B receive the pulses sent back by P and transmit them to a central station C. At central station C the time of arrival of the pulses coming from A may be compared with those coming from B, that is, the pulses that have followed path AP+PA with those that have followed path AP+PB. This comparison may be made in the manner described with regard to Fig. 4.

In the two examples just described it is obvious that central station C may, in practice, be located either at station A or B, but preferable at station A in the second case. The BC or BA connection may be made either by cable or by radio.

When only A transmits, a device may be arranged at B of the same nature as the one installed on the moving body, so that it will receive on frequency $f$ or $f'$ transmitted from moving-body P and retransmit on frequency $f$ or $f'$ or on a third frequency $f''$. While it is possible to use at B and P amplifier relays with a single frequency $f$, precautions being taken at each point to avoid any confusion between the transmissions from the other two points, nevertheless it is preferable to use three different frequencies, which leads to the employment at B and P of high efficiency pulse-transmitters without additional precautions.

When only one fixed station is available or it is desired to use a single fixed station, the invention, according to another of its aspects, provides for the simultaneous use at that station of a pulse transmitter, a pulse receiver, and a radio direction finder. Such an arrangement is shown in Fig. 5, in harmony with the picture of the coordinates of the moving body given in Fig. 3.

In Fig. 5, which shows schematically the equipment required at a fixed station in order to follow the route of a moving body P, such as an airplane, a radioelectric transmitter 25, preferably operating on a short or ultra-short wavelength, sends out periodical pulse trains, which are returned by the moving body either by means of an antenna tuned to the same wavelength, or to another wavelength, or else by the reflection produced by the metallic masses of the moving body itself.

At the same time that the pulses are sent out by the transmitter, they are applied in the manner indicated before to the deflection-plates of a cathode-ray oscillograph 26 so as to synchronize a spiral scanning of the screen 27 of this oscillograph obtained by means of a scanning-voltage generator 28. The pulses sent back by the moving body are received by a radio direction finder 29 associated with a pulse receiver 30.

After having been retarded in a suitable retardation line 31, the pulses received by receiver 30 are applied to the control grid of cathode-ray oscillograph 26, thus causing the appearance of a circular indication such as indicated at 32 in Figs. 5 and 3.

The output voltages of radio direction finder 29 are applied in known manner over a retardation line 33 to the two pairs of deflection plates of a cathode-ray oscillograph 34 in order to cause the appearance on the screen 35 of this oscillograph of a rectilinear indication 36, radius or diameter, giving the bearing of moving-body P with respect to a given origin. Such an indication is found again at A"P" in Fig. 3. By observing the two indications 32 and 36 simultaneously, by means of a translucid screen 37, for example, an observer 38 will see the image shown in Fig. 3 and will be able to deduce therefrom the bearing and the distance of the moving body being watched.

It should be remarked that the distance "AP" actually represents twice the distance from the moving body to the watch station; in fact, as shown by impulse indications 39 to 41 below screen E in Fig. 3, transmission pulse 39 of transmitter 25 corresponds to the center of the diagram, pulse 40 indicates the time the pulse is received at the moving body and occurs halfway between the center of the diagram and circular indication 32, while the third pulse 41 is the return of the reflected pulse received at 30. The distance-scale hence should be chosen as to allow direct reading.

Figure 6:
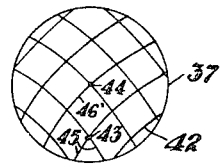
Fig. 6 shows the screen of a cathode-ray oscillograph whose scanning has been modified so as to obtain an enlargement of the displacement zone of the moving body.

When it is desired to follow the moving body more accurately, for example when the moving body has reached an interesting position in space, an enlarged image of its route can be obtained, according to still another aspect of the invention, by acting upon the scanning of the cathode-ray oscillograph or oscillographs. Fig. 6 shows at 42 such an enlarged scanning where two successive positions of the moving body 43 and 44 are given by the intersection of pairs of luminous circles 43 and 46 in the case of Fig. 4. The enlargement of the spiral scanning can be obtained either by extending uniformly the coordinates of the initial diagram through increase of the amplitude of the deflection voltages, then bringing the interesting portion back again on the screen of the oscillograph by means of appropriate adjustable biasing voltages applied to the deflection system of the oscillograph, or by causing the scanning speed to vary so as to show an enlarged portion of the diagram in the interesting region by acting upon the circuit determining the law of variation of amplitude of the deflection voltages, or still by using a device having a scale and vernier similar to those described in application Serial No. 417,180, filed October 30, 1941.

Still other modifications and adaptations of the arrangement shown and described may be made without departing from the scope of the invention.

What is claimed is:

A system for indicating the position of a distant body capable of returning received radio frequency impulses, comprising means for radiating energy impulses to said body, a first receiving means for receiving impulses returned from said body, a second receiving means for receiving impulses returned from said body, said second receiving means being spaced a predetermined significant distance from said first receiving means, said body having different characteristics of position with respect to said first and said second receiving means respectively, a first reproducing means responsive to the impulse received by said first receiving means for producing the first indication corresponding to a characteristic of the position of said object with respect to said first receiving means, a second reproducing means responsive to the impulse received by said second receiving means for producing the second indication corresponding to a characteristic of position of said body with respect to said second receiving means, and means for combining said indications including means to superpose the separate indications thereby producing a resultant indication of the position of said body not given by the said first and second indications when uncombined, said combined indications being positioned with respect to each other in proportion to the spacing of said first and second receiving means.

EDMOND M. DELORAINE.
EMILE LABIN.
PAUL FRANÇOIS MARIE GLOESS.

REFERENCES CITED

The following references are of record in the file of this patent:

UNITED STATES PATENTS

| Number | Name | Date |
| --- | --- | --- |
| 2,207,267 | Plaistowe | July 9, 1940 |
| 2,083,203 | Schlesinger | June 8, 1937 |
| 1,706,185 | Sabbah | Mar. 19, 1929 |
| 2,251,984 | Cleaver et al. | Aug. 12, 1941 |
| 2,225,046 | Hunter | Dec. 17, 1940 |
| 2,055,883 | Terry | Sept. 29, 1936 |
| 2,301,826 | Steudel et al. | Nov. 10, 1942 |

FOREIGN PATENTS

| Number | Country | Date |
| --- | --- | --- |
| 526,658 | Great Britain | Sept. 23, 1940 |